US 11,940,997 B2

(12) United States Patent
Ghazal et al.

(10) Patent No.: US 11,940,997 B2
(45) Date of Patent: Mar. 26, 2024

(54) QUERY PROCESSING USING LOGICAL QUERY STEPS HAVING CANONICAL FORMS

(71) Applicant: Futurewei Technologies, Inc., Plano, TX (US)

(72) Inventors: Ahmad Ghazal, Redondo Beach, CA (US); Ron-Chung Hu, Palo Alto, CA (US); Mingyi Zhang, Santa Clara, CA (US)

(73) Assignee: Futurewei Technologies, Inc., Addison, TX (US)

( * ) Notice: Subject to any disclaimer, the term of this patent is extended or adjusted under 35 U.S.C. 154(b) by 255 days.

(21) Appl. No.: 17/446,679

(22) Filed: Sep. 1, 2021

(65) Prior Publication Data
US 2022/0004551 A1    Jan. 6, 2022

Related U.S. Application Data

(63) Continuation of application No. PCT/CN2020/080149, filed on Mar. 19, 2020.
(Continued)

(51) Int. Cl.
*G06F 16/24* (2019.01)
*G06F 16/22* (2019.01)
(Continued)

(52) U.S. Cl.
CPC ...... *G06F 16/2433* (2019.01); *G06F 16/2255* (2019.01); *G06F 16/2455* (2019.01)

(58) Field of Classification Search
CPC ............. G06F 16/2433; G06F 16/2255; G06F 16/2455; G06F 7/16
(Continued)

(56) References Cited

U.S. PATENT DOCUMENTS 6,618,719 B1 * 9/2003 Andrei ............. G06F 16/24547
6,738,755 B1 * 5/2004 Freytag ............ G06F 16/24545
707/999.005

(Continued)

FOREIGN PATENT DOCUMENTS

CN    102930003 A    2/2013
WO    WO-2020192542 A1    10/2020

OTHER PUBLICATIONS

"International Application No. PCT/CN2020/080149, International Search Report and Written Opinion dated Jun. 18, 2020", (dated Jun. 18, 2020), 8 pgs.
(Continued)

*Primary Examiner* — Hicham Skhoun
(74) *Attorney, Agent, or Firm* — Schwegman Lundberg & Woessner, P.A.

(57) ABSTRACT

A query processing device includes a communication interface accessing a database and database catalog, a memory storing instructions, and a processor coupled to the memory and the communication interface. The processor executes the instructions to parse a query and generate first and second execution plans for the query, retrieve respective previously determined cardinality values for previously executed logical steps of the first and second execution plans from the database catalog, select an execution plan from the first execution plan or the second execution plan, the selected execution plan having a lower cost based on the previously determined cardinality values, and execute the selected execution plan on data accessed from the database. The query processing system stores actual cardinality values determined during the execution of the logical steps in the database catalog for use by subsequent queries. The query processing device, therefore, re-uses previously determined cardinality values.

20 Claims, 4 Drawing Sheets

Related U.S. Application Data

(60) Provisional application No. 62/822,463, filed on Mar. 22, 2019.

(51) Int. Cl.
*G06F 16/242* (2019.01)
*G06F 16/2455* (2019.01)

(58) Field of Classification Search
USPC .......................................................... 707/769
See application file for complete search history.

(56) References Cited

U.S. PATENT DOCUMENTS

| | | | |
|---|---|---|---|
| 9,183,254 B1 * | 11/2015 | Cole | G06F 16/2453 |
| 10,528,599 B1 * | 1/2020 | Pandis | G06F 16/2455 |
| 10,776,368 B1 * | 9/2020 | Caragea | G06F 16/2462 |
| 11,216,457 B1 * | 1/2022 | Pandis | G06F 16/22 |
| 2003/0229617 A1 * | 12/2003 | Rjaibi | G06F 16/24545 |
| 2004/0010488 A1 | 1/2004 | Chaudhuri et al. | |
| 2004/0181521 A1 * | 9/2004 | Simmen | G06F 16/24542 |
| 2005/0222965 A1 * | 10/2005 | Chaudhuri | G06F 16/2457 |
| 2005/0267877 A1 | 12/2005 | Chaudhuri et al. | |
| 2006/0282422 A1 * | 12/2006 | Al-Omari | G06F 16/24544 |
| 2007/0233637 A1 * | 10/2007 | Corvinelli | G06F 16/2462 |
| 2009/0259641 A1 | 10/2009 | Balmin et al. | |
| 2009/0259644 A1 * | 10/2009 | Scheuermann | G06F 16/24542 |
| 2014/0317088 A1 * | 10/2014 | Al-Omari | G06F 16/24542 707/718 |
| 2015/0149441 A1 * | 5/2015 | Nica | G06F 16/24542 707/719 |
| 2018/0101573 A1 * | 4/2018 | Sheng | G06F 16/24544 |
| 2018/0246649 A1 * | 8/2018 | Datar | H03M 7/3091 |
| 2018/0341679 A1 * | 11/2018 | Moerkotte | G06F 16/2455 |
| 2018/0349364 A1 * | 12/2018 | Arnold | G06F 16/901 |
| 2019/0236188 A1 * | 8/2019 | McKenna | G06F 16/24565 |

OTHER PUBLICATIONS

"Chinese Application No. 202080023252.X, Office Action dated Jul. 29, 2023", (dated Jul. 29, 2023), 6 pgs.

* cited by examiner

QUERY PROCESSING USING LOGICAL QUERY STEPS HAVING CANONICAL FORMS

CROSS-REFERENCE TO RELATED APPLICATIONS

This application is a continuation application of International Application No. PCT/CN2020/080149, filed 19 Mar. 2020, which claims the benefit of priority to U.S. Provisional Application 62/822,463, filed 22 Mar. 2019, the benefit of priority of each of which is claimed herein, and which applications and publication are hereby incorporated herein by reference in their entirety.

TECHNICAL FIELD

The present disclosure is related to query processing in a database management system (DBMS), and in particular to a DBMS that parses queries into logical steps having canonical forms and stored cardinality information.

BACKGROUND

Database query optimization methods use cardinality and data size estimation to formulate better queries in a cost-based query optimization system. Cardinality is a measure of the uniqueness of data values in a particular column of a database. A low cardinality value for the column may indicate a large number of duplicated elements in the column. Cardinality estimates include row counts and numbers of distinct values of base tables (e.g., database columns) and intermediate results (e.g., intermediate data resulting from operations on the base tables). The amount of output data from the execution of each operator is also a cardinality value that can affect performance. Row count, number of distinct values, and data size play important roles in operations such as join ordering, selecting the type of join method, and selecting the type of aggregation method to be used in the execution plan for a particular query.

For example, DBMSs employ two types of join algorithms, the Nested Loop join algorithm and the Sort Merge join algorithm. For an example join operation, JOIN (A, B), the Nested Loop algorithm compares each record in table A to each record in table B to generate the joined table while the Sort Merge join algorithm separately sorts table A and table B and combines the sorted tables to generate the joined table. The Nested Loop algorithm is more efficient with relatively small tables while the Sort Merge algorithm is more efficient for relatively large tables. Thus, the query optimizer for the DBMS would benefit from knowing the cardinality of the tables to be joined.

SUMMARY

A DBMS parses a query to generate an execution plan. In the examples described below, an execution plan is a combination of logical steps that are combined to implement a database query. A logical step is a sub-part of the query that acts on one or more database columns to produce an intermediate result. The results of multiple logical steps may be combined in other logical steps to execute the full query. In the execution plans described below, each of the logical steps has a canonical form with fully qualified column names which, where possible, are arranged in a predetermined (e.g., alphabetical) order. After executing the plan, the DBMS stores, in a database catalog, statistics for the execution plan and for the logical steps that make up the execution plan. The stored statistics are indexed by respective hash values derived from the canonical forms of the steps. A query optimizer of the DBMS accesses these stored statistics when processing later-occurring queries to select one or more query plans for a later-occurring query that includes one or more of the same logical steps. The statistics are accessed using hash values generated from the canonical-form steps of the execution plans of the later-occurring queries.

These examples are encompassed by the features of the independent claims. Further embodiments are apparent from the dependent claims, the description, and the figures.

According to a first aspect, a query processing device includes a communication interface for accessing a database and a database catalog, memory storing instructions, and a processor coupled to the memory and the communication interface. The processor executes the instructions to parse a query to generate first and second execution plans for the query, each of the first and second execution plans including one or more logical steps, retrieve respective previously determined cardinality values for previously executed logical steps of the first and second execution plans from the database catalog, select an execution plan from the first execution plan or the second execution plan, the selected execution plan having a lower cost based on the previously determined cardinality values, and execute the selected execution plan using data accessed from the database via the communication interface.

In a first implementation form of the device according to the first aspect as such, the processor is configured to parse the query configure the processor to generate the logical steps in respective canonical forms having defined syntaxes and including respective source names.

In a second implementation form of the device according to the first aspect as such, the processor is configured to retrieve previously determined cardinality values for the first and second execution plans.

In a third implementation form of the device according to the first aspect as such, the processor is configured to fully qualify each source name of each logical step in each of the first and second execution plans. The processor is also configured to determine that a first logical step of the one or more logical steps has multiple source names, and is commutative and arranges the multiple source names in the first logical step in a predetermined order.

In a fourth implementation form of the device according to the first aspect as such, the processor is configured to determine that the first logical step is for an operation including Inner Join, Full Join, Multi-Way Join, Union, or Intersect.

In a fifth implementation form of the device according to the first aspect as such, the processor is configured to calculate respective hash values for each logical step of the first and second execution plans. The processor is further configured to access the database catalog based on the respective hash values to retrieve the respective previously determined cardinality values for the logical steps of the first and second execution plans.

In a sixth implementation form of the device according to the first aspect as such, the one or more logical steps include structured query language (SQL) operations including at least one of a Scan operator, a Join operator, an Aggregate Scan By operator, a Union operator, or an Intersect operator.

In a seventh implementation form of the device according to the first aspect as such, the Join operator includes at least one of a Single Join operator, a Multi-Way Join operator, a Left Outer Join Operator, a Semi-Join Operator, an Anti-Join operator, or a Full Outer Join operator.

In an eighth implementation form of the device according to the first aspect as such, the processor is configured to execute each logical step of the selected execution plan. The processor is also configured to obtain respective actual cardinality values for each executed logical step and obtain the respective hash value for each executed logical step. The processor is configured to store the respective actual cardinality values in the database catalog indexed by the obtained respective hash values.

In a ninth implementation form of the device according to the first aspect as such, the processor is further configured to estimate a cardinality for each logical step in each of the execution plans that does not have a previously determined cardinality value in the database catalog and to select the one of the first execution plan or the second execution plan having the lower cost based on both the retrieved previously determined cardinality values and the estimated cardinality values.

According to a second aspect, a method for processing queries parses a query to generate first and second execution plans for the query, each of the first and second execution plans including one or more logical steps. The method retrieves respective previously determined cardinality values for previously executed logical steps of the first and second execution plans from a database catalog. Based on the previously determined cardinality values, the method selects one of the first execution plan or the second execution plan having a lower cost and executes the selected execution plan on data from a database.

In a first implementation form of the method according to the second aspect as such, the parsing of the query includes generating the logical steps in respective canonical forms having defined syntaxes and including respective source names.

In a second implementation form of the method according to the second aspect as such, the retrieving of the previously determined cardinality values for the previously executed logical steps of the first and second execution plans further includes retrieving previously determined cardinality values for the first and second execution plans.

In a third implementation form of the method according to the second aspect as such, the parsing of the query includes fully qualifying each source name of each logical step in each of the first and second execution plans. The method further includes determining that a first logical step of the one or more logical steps has multiple source names and is commutative and arranging the multiple source names in the first logical step in a predetermined order.

In a fourth implementation form of the method according to the second aspect as such, the determining that the first logical step is commutative includes determining that the first logical step is for an operation including Inner Join, Full Join, Multi-Way Join, Union, or Intersect.

In a fifth implementation form of the method according to the second aspect as such, the method further includes calculating respective hash values for each logical step of the first and second execution plans and accessing a database catalog based on the respective hash values to retrieve the respective previously determined cardinality values for the logical steps of the first and second execution plans.

In a sixth implementation form of the method according to the second aspect as such, the parsing of the query includes parsing a structured query language (SQL) query into operations including at least one of a Scan operator, a Join operator, an Aggregate Scan By operator, a Union operator, or an Intersect operator.

In a seventh implementation form of the method according to the second aspect as such, the executing of the selected execution plan on data from the database includes executing each logical step of the selected execution plan. The method further includes obtaining respective actual cardinality values for each executed logical step and obtaining the respective hash value for each executed logical step. The method also includes storing the respective actual cardinality values in a database catalog indexed by the obtained respective hash values.

In an eighth implementation form of the method according to the second aspect as such, the selecting of one of the first execution plan or the second execution plan based on the retrieved previously determined cardinality values further includes estimating a cardinality for each logical step in each of the execution plans that does not have a previously determined cardinality value in a database catalog. The method also includes selecting the one of the first execution plan or the second execution plan having the lower cost based on both the retrieved previously determined cardinality values and the estimated cardinality values.

According to a third aspect, a non-transitory computer-readable media stores instructions that when executed by one or more processors cause the one or more processors to parse a query to generate first and second execution plans for the query, each of the first and second execution plans including one or more logical steps, retrieve respective previously determined cardinality values for previously executed logical steps of the first and second execution plans from a database catalog, select an execution plan from the first execution plan or the second execution plan, with the selected execution plan having a lower cost based on the previously determined cardinality values, and execute the selected execution plan on data from a database.

According to a fourth aspect, a query processing device includes a communication interface configured for accessing a database and a database catalog, an execution plan means for parsing a query and generating first and second execution plans for the query, each of the first and second execution plans including one or more logical steps, a cardinality means for retrieving respective previously determined cardinality values for previously executed logical steps of the first and second execution plans from the database catalog, a selection means for selecting an execution plan from the first execution plan or the second execution plan, the selected execution plan having a lower cost based on the previously determined cardinality values, and execution means for executing the selected execution plan on data accessed from the database via the database interface.

DETAILED DESCRIPTION

Figure 1:
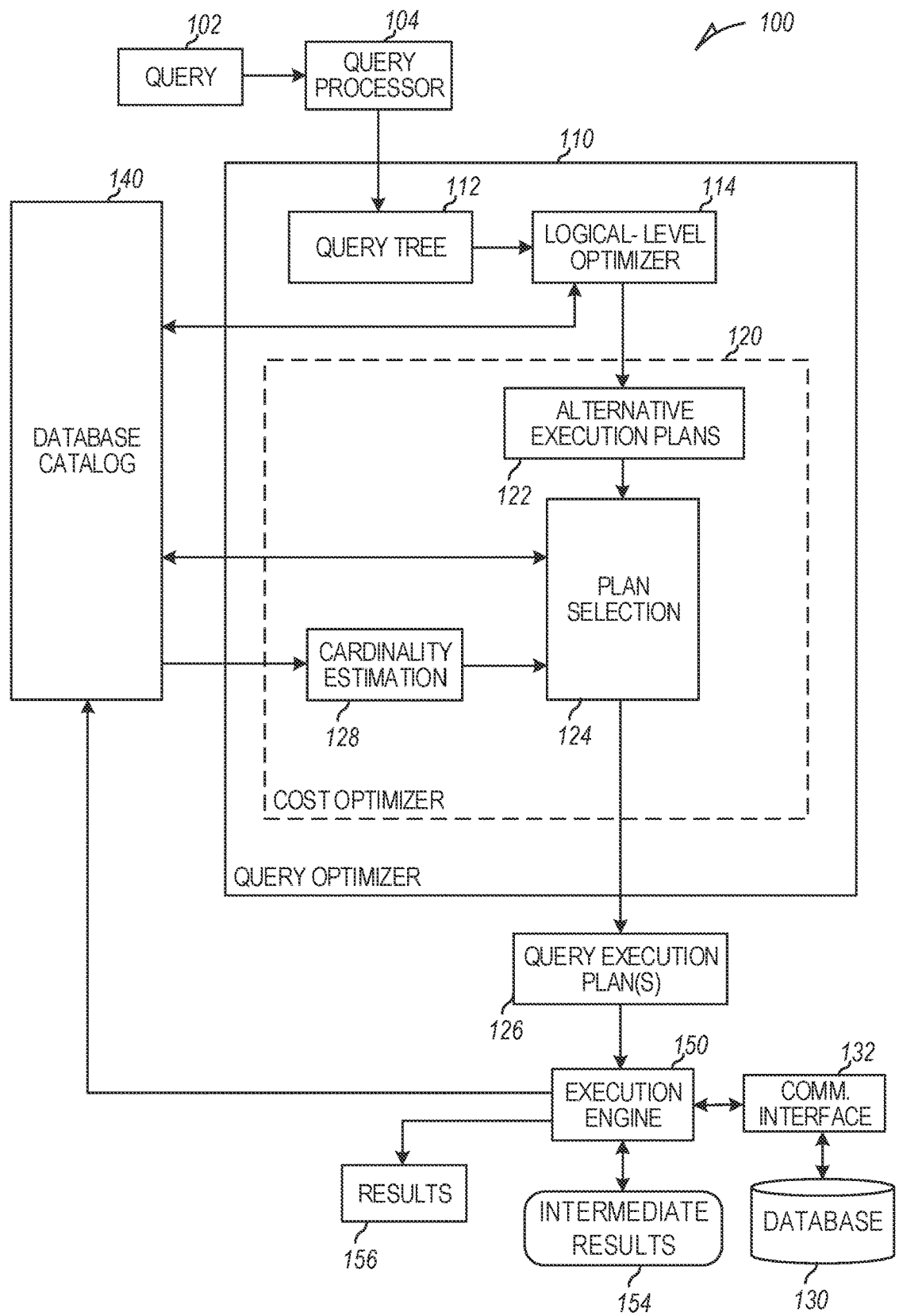
FIG. 1 is a block diagram of a system for processing database queries according to an example embodiment.

In the following description, reference is made to the accompanying drawings that form a part hereof, and which is shown by way of illustration specific embodiments which may be practiced. These embodiments are described in sufficient detail to enable those skilled in the art to practice the disclosed subject matter, and it is to be understood that other embodiments may be utilized and that structural, logical, and electrical changes may be made without departing from the scope of the appended claims. The following description of example embodiments is, therefore, not to be taken to limit the appended claims.

The execution plans generated by cost-based query optimizers may be sensitive to the accuracy of cardinality and data size estimations. A cost-based query optimizer may select an execution plan for a query from among multiple execution plans as the execution plan having the lowest cost (e.g., the shortest response time, lowest CPU and/or I/O processing cost, and/or lowest network processing cost). These costs are significantly affected by the amount of data being processed (data size) and the number of different data values being processed (cardinality).

Cardinality estimation can exhibit considerable variation and may overestimate or underestimate the true cardinality and data size values. Many relational DBMSs use the ANALYZE command to collect cardinality and data size values. The ANALYZE command generates statistics for a table or an individual column of a table. In addition to the total number of values, the ANALYZE command may return other statistics, such as a break-down of the number of different entries in the table or column. Running the ANALYZE command may be expensive, especially on a large data set. Consequently, statistics generated from one invocation of an ANALYZE command may be stored and used for future operations on the table or column. After the table or column has experienced multiple inserts, deletes, and updates, however, these statistics may become stale and the database administrators need to rerun the ANALYZE command to refresh the statistics. As an alternative to using the ANALYZE command, a DBMS may obtain cardinality data from the histograms of the table.

Errors in cardinality estimation may also result from correlated columns referenced in a predicate or join condition. For example, consider the following query:

SELECT customer_id,purchase_price FROM car_sales WHERE Maker='Honda' AND Model='Accord'  [1]

In this query, "Maker" and "Model" are separate columns of the table. These columns, however, may have a high correlation because the model names used by each automaker are typically exclusive to that automaker.

Another possible source of cardinality estimation errors results from expressions containing "regular expressions." As used herein, a "regular expression" is a sequence of characters that define a search pattern. An example regular expression includes the following:

WHERE product_name LIKE '% green %' or WHERE o_comment NOT LIKE '% special % requests %'  [2]

The first expression searches the product name field of a database for names that include the characters "green." The second expression searches the other comments field of the database for comments that are not special requests. Because the results of these searches are unknown, it is difficult to estimate the size of the data resulting from the use of the expressions.

A query optimizer in a DBMS attempts to choose the best execution plan from among many different execution plans. As described above, query optimizers use cardinality estimation to select the best plan. A query optimizer according to an example embodiment overcomes the problems described above by breaking each complex query down into a plurality of steps and capturing the actual cardinality of the complex query and its component steps when the query is executed. These cardinality values are formatted and stored so that they can be used to select the best query plan from a set of later-occurring query plans that include the same queries and/or steps.

The embodiments described below reuse statistics from previous query plan executions to obtain cardinality information for use by later queries. This solution includes a producer side and a consumer side. The producer side captures the cardinality statistics of actual executions, and the execution engine saves them into a catalog table of the DBMS. The consumer side is the cardinality estimation component of the optimizer, which fetches the cardinality information from the catalog and uses the cardinality information to select the best execution plan for a received query.

The device and method can re-use previously determined cardinality values, increasing the ability to choose the best execution plan. The device and method can be used for query optimization. The device and method can be used for selecting an execution plan. The device and method can be used for selecting a lowest cost execution plan. The device and method can be used for reusing previously generated cardinality values instead of using cardinality estimates. The device and method can be used to improve database query performance through improved statistics estimation. The device and method can be used to improve database query performance through the re-use of previous cardinality values instead of relying on estimates of cardinality values. The device and method can be used to maximize the reusability of previously executed query statistics.

FIG. 1 is a block diagram of a system 100 for processing database queries according to an example embodiment. The system 100 in the embodiment shown includes a query source 102 and/or receives a database query. In the examples described below, a query can include information obtained from a database column, a set of input values, or comprises an intermediate result generated by a previous logical step. The examples described below use Structured Query Language (SQL) queries, although it is contemplated that other query languages may be used. The system 100 in the embodiment shown includes a query processor 104, a query optimizer 110 including a cost-based (physical-level) optimizer 120, a communication interface 132 for communicating with a database 130, a database catalog 140, and an execution engine 150. The system 100 in some embodiments comprises a database management system (DBMS) technology. The communication interface 132 can communicate with one or both of the database 130 and the database catalog 140. In some embodiments, the query processor 104 parses a received query into multiple logical steps to generate a query tree 112. A query tree includes a root logical step, one or more child logical steps, and one or more leaf logical steps that do not have child logical steps. Each logical step has a canonical form, following a defined syntax, and fully-qualified source name(s) arranged in the predetermined order. The logical steps generated from the queries by the examples described below are canonical in that the logical steps have a syntax defined by rules, such that two queries that include the same logical step generate the same textual representation of that logical step. Although the embodiments described below process SQL queries, it is contemplated that other embodiments may process other types of database queries.

The query optimizer 110 processes the logical steps in the query tree to generate one or more query execution plans 126 for execution by the execution engine 150, such as a first execution plan and a second execution plan. For simplicity, the discussion will hereinafter recite the first execution plan and the second execution plan, but it should be understood that any number of query execution plans may be generated. To generate the one or more query execution plans 126, the query optimizer 110 and cost-based optimizer 120 may access and/or receive information from the database catalog 140. In the example embodiment, the database tables are searched according to the queries that reside in the database 130.

In some embodiments, the query processor 104 checks the syntactical structure of query 102 in addition to generating query tree 112. The query processor 104 analyzes the semantics of the query tree 112 to determine whether issues exist, such as incompatible operations types or references to non-existent tables. Although not shown in FIG. 1, query processor 104 may access information from the database catalog 140 to implement these functions.

The query optimizer 110 includes a logical-level optimizer 114 that applies rules and retrieves cardinalities of the logical steps in query tree 112 to generate execution plans for the query tree based on the retrieved cardinalities and optimization rules. The logical-level optimizer 114 may calculate separate hash values for the entire query tree 112 and sub-branches of the query tree 112 including individual logical steps and access cardinality data from the database catalog 140 based on the hash values. Because the logical steps in the query are generated according to the canonical forms, as described below, the same logical steps occurring in different queries have the same text and, thus, the same hash value. Thus, if the cardinalities for the logical steps are stored in the database catalog 140 and are indexed by their hash values, the logical-level optimizer 114 may quickly retrieve the cardinalities for previously executed queries and/or for each previously executed subpart. The logical-level optimizer 114 may then generate a plurality of execution plans 122 and evaluate the different plans based on the returned cardinalities. The execution plans 122 can specify different orders of execution for the logical steps and/or different types of operations (e.g., different types of join operations such as Hash Join, Nested Loop Join, or Merge Join). As described above, the cardinality of the source and/or column and/or the size of the output results can affect the cost of each logical step in the execution plan and, thus, the cost of the overall execution plan.

The cost-based optimizer 120 receives the execution plans 122 and applies these plans to a plan selection module 124. The plan selection module 124 accesses the database catalog 140 and a cardinality estimation module 128 to select one or more execution plans of the execution plans 122. When cardinality data for a logical step of a particular execution plan 122 is stored in the database catalog 140, the plan selection module 124 uses the stored data. In example systems, the cardinality data retrieved by the logical-level optimizer 114 may be passed with the execution plans 122 to the plan selection module 124. When the database catalog 140 does not include cardinality data for a logical step or a table, the cardinality estimation module 128 generates an estimate of the cardinality of a table, for example, by using statistics previously generated by an ANALYZE command, by sampling data in the table, and/or by generating histograms of the table.

The plan selection module 124 also accesses cost functions from the database catalog 140 to estimate costs for the execution plans 122. The cost functions can use cardinality estimations from the database catalog 140 and/or from the cardinality estimation module 128 and/or other statistics to estimate the cost of executing each plan. The plan selection module 124 selects one or more of the lower-cost execution plans 122 as the query execution plan(s) 126.

The execution engine 150 executes the query execution plan(s) 126 using data in the database 130 to generate intermediate results 154, which are further processed to generate the output results 156. As a part of executing the query execution plan(s) 126, the execution engine 150 determines the actual cardinality of the component tables of the queries and the intermediate results 154. This cardinality data is fed back to the database catalog 140, with the corresponding hash values, in a closed-loop configuration for use in the optimization of subsequent queries 102.

As described below, each SQL query can include one or more predicates. Each predicate may be defined as a condition under which a given portion of a data table satisfies a portion of the execution plan 122. Such predicates can be determined and/or evaluated based on one or more views.

The plan selection module 124 selects the execution plan 122 having the smallest cost. As these costs are based on cardinality estimates, better cardinality estimates can improve the performance of the plan selection module 124.

For example, the cost of performing a query may depend on the order of operations in the execution plans 122. A plan that evaluates the logical steps of the query tree in one order may produce a larger intermediate result than a plan that evaluates the logical steps in a different order. Thus, it is desirable to know not only the cardinality of the source tables but also the cardinality of any intermediate tables that may be generated by a query plan. As part of execution plan generation, the logical-level optimizer 114 may specify the order of query operations (e.g., predicate evaluation or combination of predicates) such that operations that are expected generate smaller intermediate results 154 occur early in the execution plan than query operations that are expected to generate larger intermediate results 154. Such ordering can be performed based on cardinality estimates, which can be regarded as an expected size of the intermediate result. The execution engine 150 may determine the cardinality of these intermediate results 154 during the execution of a first query plan and make these cardinality values available for use by the logical-level optimizer 114 and/or the plan selection module 124 to generate/select the best query execution plan for a later occurring query.

The examples below describe a general and logical canonical form that allows the execution engine 150 to capture information in each logical step in the query. The canonical form logical steps are generated on the producer side. The canonical form logical steps (and their corresponding cardinality statistics) are saved into the database catalog 140 by the execution engine 150. On the consumer side, the query optimizer 110 generates the query tree, including the logical canonical form logical steps, and accesses the database catalog 140 to quickly find the matching canonical forms and their associated cardinality and data size information.

The examples described below collect statistics on previously executed queries and make these statistics available for later-occurring queries. The canonical forms of the logical steps of the execution plan allow the query optimizer 110 to determine the best execution plan, based on a set of execution steps because the query optimizer 110 can quickly determine the cardinality of the execution steps, database columns, and intermediate results based on the actual cardinality of the same previously executed steps using the same database columns and intermediate results. The granularity of statistics maintained by the system is at the execution step level, not at the query level. Furthermore, the cost-based optimizer 120 uses cardinality data to perform physical query optimization. The general canonical form, described below, is at the logical level. It does not include information such as join order, join algorithm, group-by order, or predicate order. The collected cardinality data, however, allows the query optimizer 110 to select one or more of the alternative execution plans 122 based on actual cardinality data for each logical step contained in the database.

The cost-based query optimizer 110 performs physical optimization. The examples below use the term "physical" to distinguish between the query optimization performed by logical level optimizer 114 and the cost-based query optimizer 110. Logical query optimization selects plans based on the retrieved cardinality data for previously performed steps. This cardinality data may not be complete, however, as not all steps in the query plan may have been previously executed and not all database columns and intermediate results may have been previously processed. The physical optimization also takes into account estimated cardinality values for steps that have not been previously performed. The cost-based query optimizer 110 also takes into account the effects of join order, join algorithm, group-by order, and predicate order on the cost of an execution plan.

As described below, each logical step is represented in a canonical form and has a corresponding hash value. The hash value may be generated by applying a hash function, for example, the MD5 hash function, to the textual representation of the logical step. The hash value allows the logical-level optimizer 114 and/or the plan selection module 124 to quickly find statistics for a particular logical step in the database catalog 140.

The hash value and its associated statistics information are saved in the database catalog 140. Alternatively, the canonical text of the logical step can also be stored in the database catalog 140. Similar to a key-value hash map, the query optimizer 110 uses a matching hash value of a canonical form logical step (e.g., a key generated from the logical step) to find the corresponding actual cardinality statistics for the logical step in the database catalog 140. As described above, in the canonical form, table names and/or column names are fully qualified. That is to say, the table names and/or column names include all names in the hierarchic sequence above the given element and the name of the table and/or column itself. Each fully qualified table name or column name is unique in the schema of its database. Furthermore, the canonical form contains all the dependency logical steps of an execution step. The canonical forms are generated recursively by including all the logical steps on which the current logical step depends. The canonical forms define keywords and syntax structure for each type of operation. The terms (e.g., table names) inside the canonical form logical steps are sorted alphabetically to increase their reusability. This is especially useful as many SQL operators have the commutative property, that is the step execution may be in any order. Thus, the system can match a logical step with a canonical form even if the order of some terms is different from the order of the corresponding teams used in previous queries. Although the fully-qualified table names are described as being in alphabetical order, the table names may be organized in a different predetermined order, for example, first by name length and then alphabetically. Any predetermined order may be used as long as it is applied to every query processed by the system 100.

The materials below describe the canonical forms for various operators used in execution steps. Each of the logical steps has a canonical form that follows a defined syntax as described below.

The SCAN operator has the following canonical form:

SCAN(source[,PREDICATE(filter-expression)])     [3]

The terms SCAN and PREDICATE are keywords and the terms inside [ ] are optional. "Source" can be either a base table (e.g., a column of the database) or an intermediate table (e.g., a table resulting from performing a previous operation in the query). The name of the table is fully qualified.

As an example of the application of the canonical form for the SCAN operator, the SQL query "SELECT * FROM t1 WHERE c1>10" generates the canonical form "SCAN(public.t1, PREDICATE(public.t1.c1>10))" where "public" is the name of the database, "t1" is a particular column of the database and "c1" is a variable representing the values in the column public.t1.

The single JOIN operator has the following canonical form:

JOIN(source1,source2[,PREDICATE(join-condition)])     [4]

The terms SCAN and PREDICATE are keywords and the terms inside [ ] are optional. The JOIN operator can be either inner join (with a join condition) or Cartesian product join (without a join condition). The items "source1" and "source2" can be either base tables or intermediate tables. Source1 and source2 are in a predetermined sorted order, in an example embodiment, the predetermined order is alphabetical.

As an example of the application of the canonical form for the JOIN operator, the SQL query "SELECT * FROM t1, t2 WHERE t1.c1=t2.c1 and t1.c1>10" generates the canonical form "JOIN(SCAN(public.t1, PREDICATE (public.t1.c1>10)), SCAN(public.t2, PREDICATE (public.t2.c1>10)), PREDICATE (public.t1.c1=public.t2.c1))" Note that the canonical form includes canonical form SCAN operator having the predicate from the SQL query.

The Multi-Way JOIN Operator (also known as the Consecutive JOIN operator) has the following canonical form:

JOIN(source1,source2,source3, . . . [,PREDICATE (join-condition)])     [5]

A Multi-Way JOIN operator can be flattened out (e.g., the sources can be separately specified without regard to the structure of the database that contains the sources) to increase the reusability of the Multi-Way JOIN canonical form. A flattened join canonical form having sorted source names allows the cardinality data to be reused in a future query even when the future query contains a different join order. The Multi-Way JOIN operation may be flattened due to the commutative property of the JOIN operator. (e.g., (A join B) produces the same result as (B join A)). Hence, (A join B join C) has the same canonical form as (B join C join A).

As an example of the application of the canonical form for the Multi-Way JOIN operator, the SQL query SELECT * FROM t1 INNER JOIN t2 ON t1.c1=t2.c1 INNER JOIN t3 ON t1.c1=t3.c1 WHERE t1.c1>10" generates the canonical form "JOIN(SCAN(public.t1, PREDICATE (public.t1.c1>10)), SCAN(public.t2, PREDICATE (public.t2.c1>10)), SCAN(public.t3, PREDICATE (public.t3.c1>10)), PREDICATE(public.t1.c1=public.t2.c1 AND public.t1.c1=public.t3.c1))."

The Left Outer JOIN operator has the following canonical form:

LEFTJOIN(source1,source2[,PREDICATE(join-condition)])     [6]

LEFTJOIN and PREDICATE are keywords. In a Left Outer JOIN operator, the order of source1 and source2 cannot be changed because the order of these two sources matters in the semantics of the Left Outer JOIN operator. Thus, the Left Outer JOIN operator cannot be flattened out. The canonical form for a Right Outer Join operator (RIGHTJOIN) is similar to the canonical form for a Left Outer JOIN operator. Many query optimizers convert the Right Outer JOIN operator to a Left Outer JOIN operator. As an example of the LEFTJOIN operator, the SQL query "SELECT * FROM t2 LEFT JOIN t1 ON t1.c1=t2.c1" generates the canonical form "LEFTJOIN(SCAN(public.t2), SCAN(public.t1), PREDICATE(public.t1.c1=public.t2.c1))." Other Join operators have similar canonical forms to the Left Outer JOIN operator. These include the Semi-join operator which has the canonical form:

SEMIJOIN(source1,source2[,PREDICATE(join-condition)])     [7]

and the Anti-join operator which has the canonical form:

ANTIJOIN(source1,source2[,PREDICATE(join-condition)])     [8]

As with the Left Outer Join operator, the order of source1 and source2 in the SEMIJOIN and ANTIJOIN operators cannot be changed because the order matters in the semantics of the operators.

The Full Outer JOIN operator has the canonical form:

FULLJOIN(source1,source2[,PREDICATE(join-condition)])     [9]

The order of source1 and source2 in the Full Outer JOIN operator may be changed to be in the predetermined order because the Full Outer JOIN operator has the commutative property.

The Aggregate Group By operator has the canonical form:

AGGREGATE(source,GROUPBY(columns)[,PREDICATE(having-condition)])     [10]

In this canonical form, the terms AGGREGATE, GROUP BY, and PREDICATE are keywords, "columns" is a list of the columns specified in GROUP BY clause, and the PREDICATE contains a condition specified in HAVING clause. As an example of the Aggregate Group By operator, the query "SELECT customer_id, COUNT(order_id) FROM orders GROUP BY customer_id HAVING COUNT (order_id)>100" generates the canonical form operator "AGGREGATE(SCAN(public.orders), GROUPBY (public.orders.customer_id), PREDICATE(count (order_id)>100))"

The Union operator has the canonical form:

UNION(source1,source2,source3, . . . )     [11]

In this canonical form, the term "UNION" is a keyword and the sources can be base tables or intermediate tables. All source names are sorted in the predetermined alphabetical order as the Union operator has the commutative property.

The Intersect operator has the canonical form:

INTERSECT(source1,source2,source3, . . . )     [12]

In this canonical form, the term "INTERSECT" is a keyword and the sources can be base tables or intermediate tables. All source names are sorted in the predetermined alphabetical order as the Intersect operator has the commutative property. In addition, consecutive INTERSECT operations can be combined, sorted, and flattened out to increase reusability.

The operations described above are not all of the operators used in embodiments of the DBMS. Canonical forms for other operators can be generated similarly.

Figure 4:
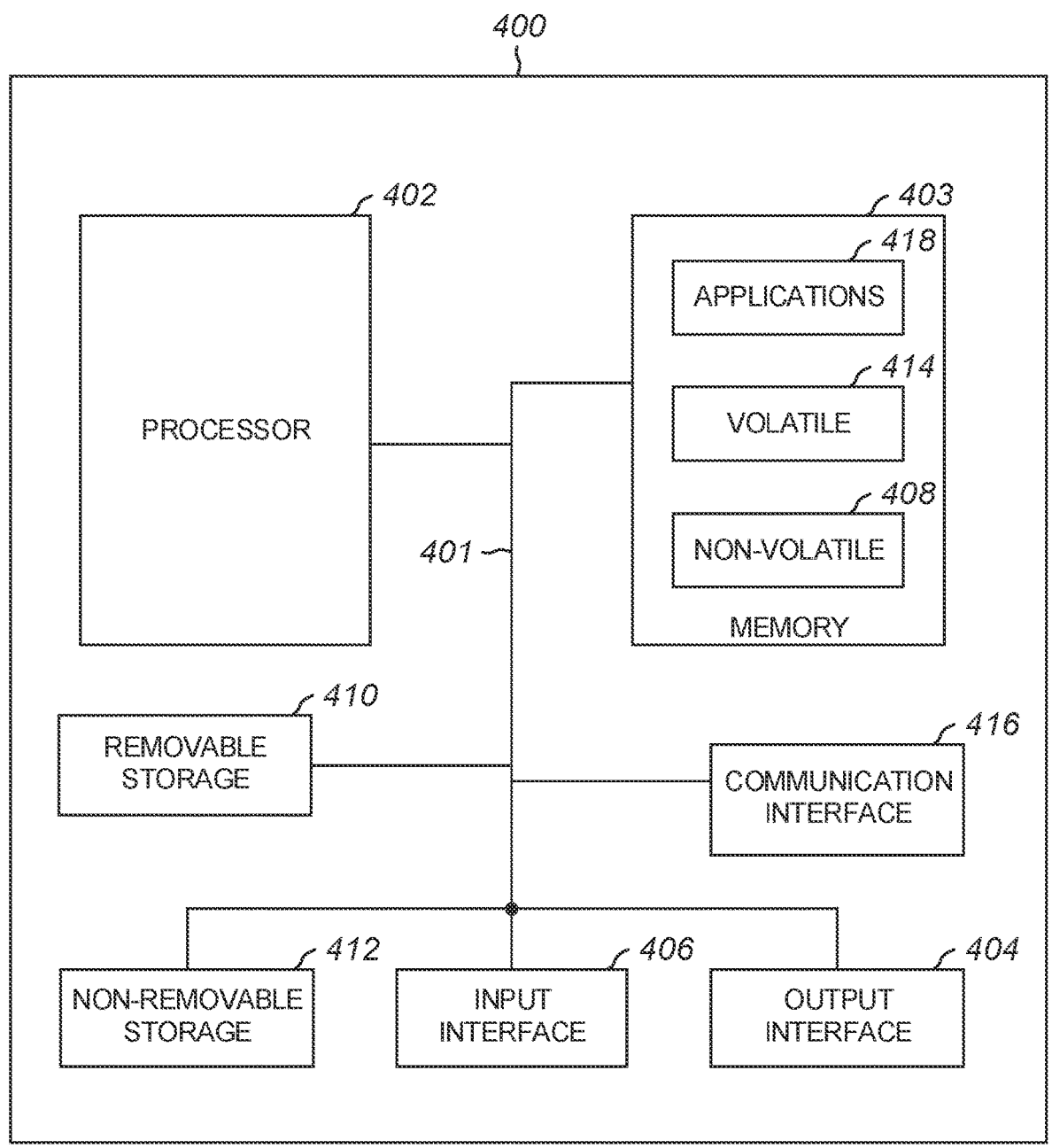
FIG. 4 is a block diagram of a computing device for performing query processing according to an example embodiment.

The query optimizer 110 can be implemented by, for example, the computing device 400 of FIG. 4. In some embodiments, the query optimizer 110 comprises a stand-alone unit. Alternatively, in other embodiments, the query optimizer 110 includes one or more of the query processor 104, the DB interface 132, the database catalog 140, or the execution engine 150.

Figure 2:
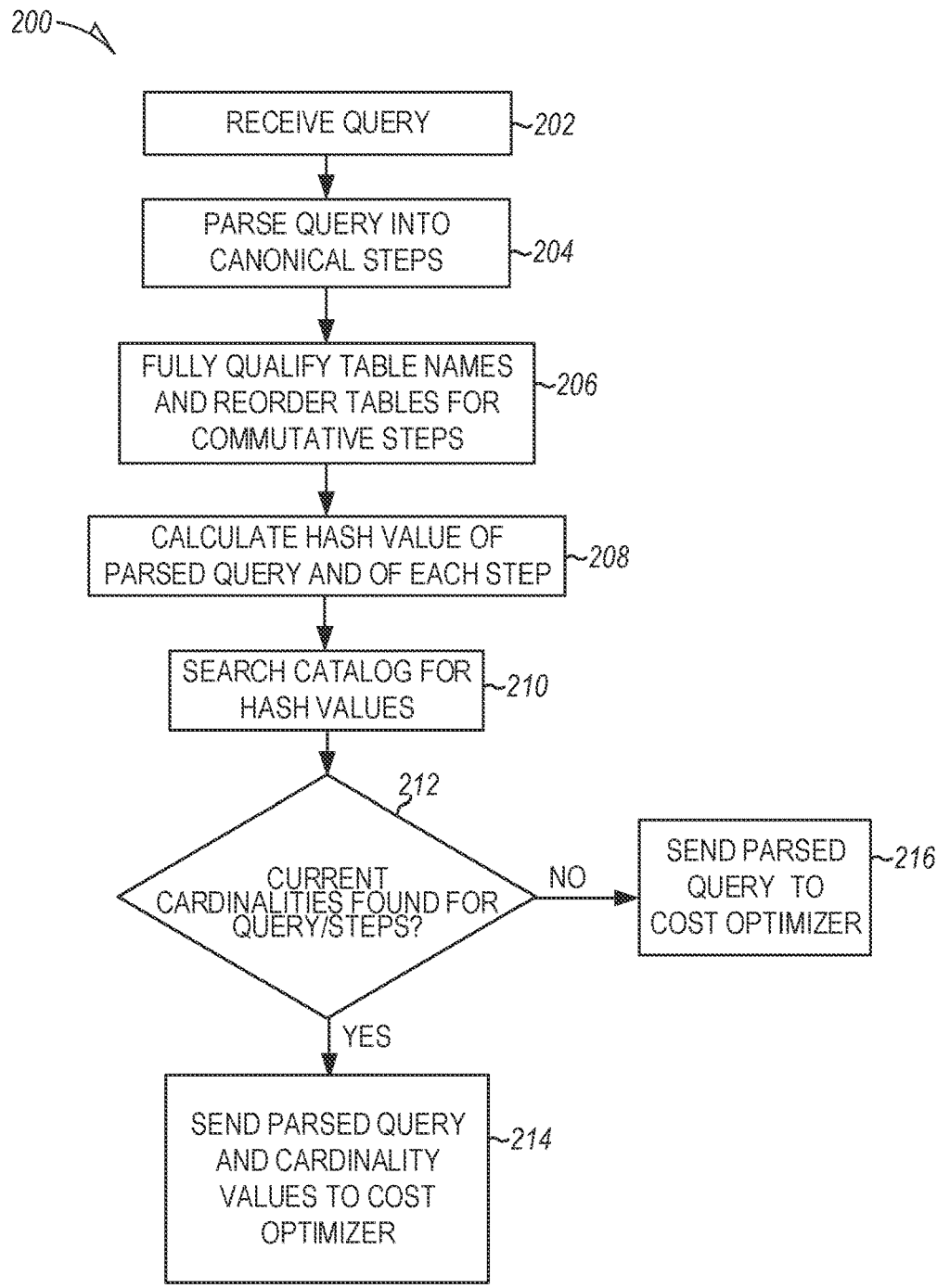
FIG. 2 is a flowchart of a query processing method according to an example embodiment.

FIG. 2 is a flowchart of a query processing method 200 according to an example embodiment. At operation 202, the method 200 receives the SQL query. At operation 204, the method 200 parses the query into one or more execution plans having canonical-form logical steps, as described above. At operation 206, the method 200 fully qualifies the table names and, for operators having the commutative property, reorders the table names in the predetermined order. At operation 208, the method 200 calculates respective hash values for each execution plan and subsets of each execution plan, including respective hash values for the individual logical steps. Operation 210 then searches a database catalog for the cardinality values based on the calculated hash values. The method 200, at operation 212, determines whether cardinalities have been found for the parsed query or any of its subparts and whether the cardinality values have current timestamps. If operation 212 determines that current cardinalities have been found, operation 214 passes on the parsed query with the found cardinality values and, optionally, the hash values of the execution plans for the query and their sub-parts for cost optimization. If operation 212 determines that no cardinalities were found, or that the cardinalities which were found have older timestamps, indicating that they are likely to be unreliable. Operation 216 sends only the parsed query for cost optimization.

Figure 3:
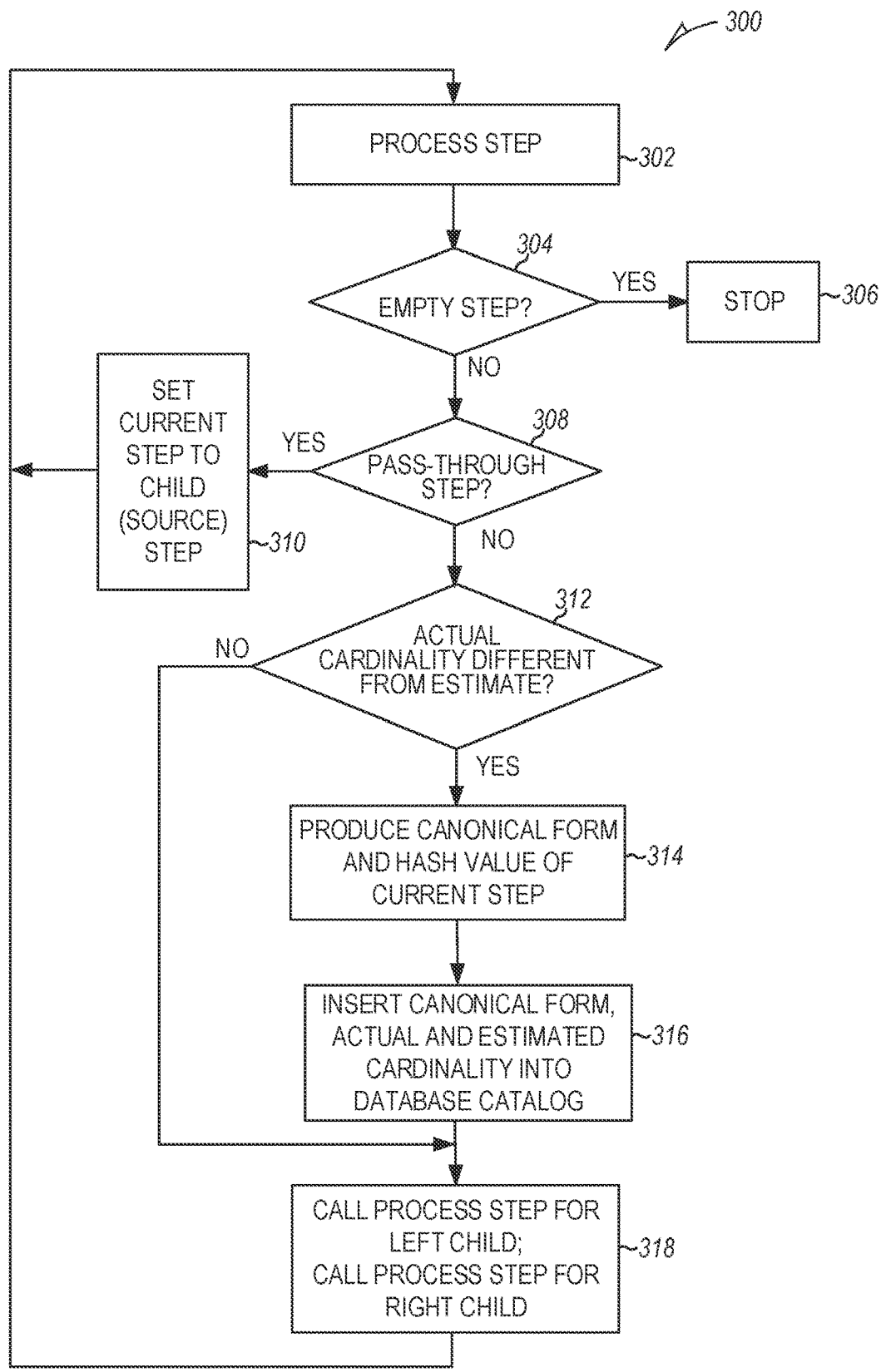
FIG. 3 is a flowchart of a query processing method according to another example embodiment.

FIG. 3 is a flowchart of a query processing method 300 according to another example embodiment. The method 300 comprises a recursive query processing method in some embodiments. The method 300 executes the steps of the execution plan(s). As described above, the execution plan is in the form of a tree. The root of the tree is the overall query and the branches are sub-parts of the tree. The leaves of the tree are fundamental operations, for example, the SCAN operations described above. The method 300 begins at operation 302, processing the root step in the execution plan. At operation 304, the method 300 determines whether the current step is an empty step, which occurs when the previous step was a leaf step that has no child steps. If the current step is a leaf step, the method 300 ends at operation 306. When operation 304 determines that the current step is not an empty step, the method 300 executes operation 308 to determine whether the current step is pass-through. A pass-through step is a step in the execution plan that is not affected by cardinality. Example non-pass-through steps include, without limitation, SCAN, JOIN, AGGREGATE, UNION, INTERSECT, MINUS, and LIMIT. These steps are sensitive to the cardinality and/or size of the data being processed. Example pass-through steps include, without limitation, SORT, window functions (e.g., SUM, COUNT, AVG), and REDISTRIBUTE. These steps are not sensitive to data cardinality and/or size. When operation 308 determines that the current step is pass-through, operation 310 sets the current step to the child of the pass-through step and branches back to operation 302 to process the new current step.

When operation 308 determines that the current step is not pass-through, then the method 300 processes the cardinality data. At operation 312, the method 300 determines whether the actual cardinality data determined when the step was executed at operation 302 is different from the estimated cardinality. The estimated cardinality may be included with the execution plan or may be obtained from a database catalog, for example. When there is no difference between the actual and estimated cardinality values, the method 300 passes control to operation 318, described below, which recursively invokes the method 300 for the two sub-trees of the current step.

When operation 312 determines that the actual cardinality determined at operation 302 is different from the cardinality estimate stored in the database catalog or received with the query execution plans, operation 314 produces the canonical form and the hash value of the current step. Operation 314 may produce these values from the execution plan or may reproduce the canonical form for the step using the rules described above. Similarly, the hash value may be received with the execution plan or may be computed from the canonical form of the step. At operation 316, the actual and estimated cardinalities of the step are stored in the database catalog, indexed by the hash value.

After operation 316 (or after operation 312 if the cardinality of the step is the same as the estimated cardinality), operation 318 invokes the method 300 for the left and right child steps of the current step. This is indicated by the branch from operation 318 to operation 302.

As an alternative to the method described above, operation 318 may occur immediately before operation 302, causing the method to recursively invoke the method until the leaves of the query tree are encountered. The method processes the leaves to generate intermediate results, which are passed back to the higher-level invocations of the method to be processed according to the branches of the query tree. This continues until the logical step at the root node is processed using the intermediate results generated by its child logical steps.

FIG. 4 is a block diagram of a computing device 400 for performing query processing according to an example embodiment. In some embodiments, the computing device 400 implements the query optimizer 110 of FIG. 1. All components need not be used in various embodiments. For example, the clients, servers, and network resources may each use a different set of components, or in the case of servers, larger storage devices.

The computing device 400 may include a processor 402, memory 403, removable storage 410, and non-removable storage 412. An application (or applications 418) can be stored in the memory 403, in the removable storage 410, and/or in the non-removable storage 412). Application 418 is shown in memory 403 for purposes of simplicity. The computing device 400 may be in different forms in different embodiments. For example, the computing device 400 may instead be any computing device configured to maintain a database. Additionally, memory 403 or non-removable storage 412 may also include cloud-based storage accessible via a network (not shown), such as the Internet, or server-based storage. Components of the computing device may be interconnected via a communication bus 401, which may include wired or wireless communication links.

Memory 403 may include volatile memory 414 and non-volatile memory 408. The computing device 400 may include (or have access to a computing environment that includes) a variety of computer-readable media, such as the volatile memory 414 and the non-volatile memory 408, the removable storage 410, and the non-removable storage 412. Computer storage includes random access memory (RAM), read-only memory (ROM), erasable programmable read-only memory (EPROM), electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computing device 400 may include or have access to a computing environment that includes an input interface 406, output interface 404, and a communication interface 416. Output interface 404 may provide an interface to a display device, such as a touchscreen, that also may serve as an input device. The input interface 406 may provide an interface in the form of a touchscreen, touchpad, mouse, keyboard, camera, one or more device-specific buttons, one or more sensors integrated within or coupled via wired or wireless data connections to the computing device 400, and/or other input devices. The computing device 400 may operate in a networked environment using the communication interface 416 to connect to one or more network nodes or remote computers, such as database servers. The remote computer may include a personal computer (PC), server, router, network PC, a peer device or other common network node, or the like. The communication interface 416 may include an interface to a local area network (LAN), a wide area network (WAN), cellular, a Wi-Fi network, and/or a Bluetooth® network, for example.

Computer-readable instructions stored on a computer-readable medium (such as an application or applications 418) are executable by the processor 402 of the computing device 400. A hard drive, CD-ROM, RAM, and flash memory are some examples of articles including a non-transitory computer-readable medium such as a storage device. The terms computer-readable medium and storage device does not include carrier waves to the extent carrier waves are deemed too transitory.

The functions or algorithms described herein may be implemented using software in one embodiment. The software may consist of computer-executable instructions stored on computer-readable media or computer-readable storage devices such as one or more non-transitory memories or other types of hardware-based storage devices, either local or networked, such as in application 418. A device according to embodiments described herein implements software or computer instructions to perform query processing, including DBMS query processing. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other types of processor operating on a computer system, such as a personal computer, server, or other computer systems, turning such computer system into a specifically programmed machine.

A query optimizer 110 or 400 in some examples comprises a communication interface 132 or 416 for accessing a database 130 and a database catalog 140, a memory 403 storing instructions for application 418, and a processor 402 coupled to the memory 403 and the communication interface 132 or 416. The processor 402 executes the instructions for application 418 to parse a query to generate first and second execution plans for the query, each of the first and second execution plans including one or more logical steps, retrieve respective previously determined cardinality values for previously executed logical steps of the first and second execution plans from the database catalog 140, select an execution plan from the first execution plan or the second execution plan, the selected execution plan having a lower cost based on the previously determined cardinality values, and execute the selected execution plan on data accessed from the database via the communication interface 132 or 416.

A query optimizer 110 or 400 in some examples comprises a communication interface 132 or 416 configured for accessing a database 130 and a database catalog 140, an execution plan means for parsing a query and generating first and second execution plans for the query, each of the first and second execution plans including one or more logical steps, a cardinality means for retrieving respective previously determined cardinality values for previously executed logical steps of the first and second execution plans from the database catalog, a selection means for selecting an execution plan from the first execution plan or the second execution plan, the selected execution plan having a lower cost based on the previously determined cardinality values, and execution means for executing the selected execution plan on data accessed from the database via the database interface.

The query optimizer 110 or 400 is implemented as the computing device 400 in some embodiments. The query optimizer 110 or 400 is implemented as a database management system (DBMS) query processing device in some embodiments.

In an example embodiment, the computing device 400 is configured to perform parsing a query to generate first and second execution plans for the query, each of the first and second execution plans including one or more logical steps, a cardinality retrieval module retrieving respective previously determined cardinality values for previously executed logical steps of the first and second execution plans, and execution plan selection module selecting an execution plan from the first execution plan or the second execution plan, with the selected execution plan having a lower cost based on the previously determined cardinality values, and a plan execution module executing the selected execution plan on data from a database. In some embodiments, the computing device 400 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A query processing device comprising:
   a communication interface for accessing a database and a database catalog;
   a memory storing instructions; and
   at least one processor in communication with the memory and the communication interface, the at least one processor configured, upon execution of the instructions, to perform the following steps:
   parsing a query to generate first and second execution plans for the query, each execution plan of the first and second execution plans including one or more logical steps in a predefined canonical form;
   retrieving, using a hash table in the database catalog, previously determined cardinality values for previously executed logical steps of the first and second execution plans, the hash table storing an entry for each logical step of the previously executed logical steps, and the entry relating a hash value of the predefined canonical form of the logical step to its cardinality value;
   selecting an execution plan from the first execution plan or the second execution plan, the selected execution plan having a lower cost based on the previously determined cardinality values; and
   executing the selected execution plan using data accessed from the database via the communication interface.

2. The query processing device of claim 1, wherein the operations for parsing the query further comprise:
   generating the one or more logical steps in the predefined canonical form, the predefined canonical form including at least one of: predefined keywords, fully qualified table names arranged in a predetermined order, or syntax templates.

3. The query processing device of claim 1, the operations further comprising:
   the retrieving the previously determined cardinality values for the previously executed logical steps of the first and second execution plans further comprising the at least one processor executing the instructions to retrieve the previously determined cardinality values for the first and second execution plans.

4. The query processing device of claim 3, wherein the operations for parsing the query further comprising:
   fully qualifying each source name of each logical step in each execution plan of the first and second execution plans;
   determining that a first logical step of the one or more logical steps has multiple source names and is commutative; and
   arranging the multiple source names in the first logical step in a predetermined order.

5. The query processing device of claim 4, wherein the operations for determining that the first logical step is commutative comprise:
   determining that the first logical step is for an operation including an Inner Join operation, a Full Join operation, a Multi-Way Join operation, a Union operation, or an Intersect operation.

6. The query processing device of claim 1, the operations further comprising:
   calculating hash values for each logical step of the first and second execution plans; and accessing the hash table in the database catalog based on the hash values to retrieve the previously determined cardinality values for the logical steps of the first and second execution plans.

7. The query processing device of claim 6, wherein the one or more logical steps include structured query language (SQL) operations including at least one of a Scan operator, a Join operator, an Aggregate Scan By operator, a Union operator, or an Intersect operator.

8. The query processing device of claim 7, wherein the Join operator includes at least one of a Single Join operator, a Multi-Way Join operator, a Left Outer Join Operator, a Semi-Join Operator, an Anti-Join operator, or a Full Outer Join operator.

9. The query processing device of claim 1, wherein the operations for executing the selected execution plan on the data accessed from the database further comprising:
   determining actual cardinality values for each of the one or more logical steps executed in the selected execution plan;
   generating new hash values based on canonical forms of the one or more logical steps executed in the selected execution plan; and
   updating the hash table in the database catalog by updating entries relating the new hash values to the actual cardinality values determined during execution of the selected execution plan.

10. The query processing device of claim 9, wherein the selecting the execution plan from the first execution plan or the second execution plan further comprising:
   estimating a cardinality value for each logical step in each of the execution plans that does not have a previously determined cardinality value in the database catalog; and
   selecting the one of the first execution plan or the second execution plan having the lower cost based on both the previously determined cardinality values and the estimated cardinality values.

11. A query processing method, the method comprising:
   parsing a query to generate first and second execution plans for the query, each execution plan of the first and second execution plans including one or more logical steps in a predefined canonical form;
   retrieving, using a hash table in a database catalog, previously determined cardinality values for previously executed logical steps of the first and second execution plans, the hash table storing an entry for each logical step of the previously executed logical steps, and the entry relating a hash value of the predefined canonical form of the logical step to its cardinality value;
   selecting an execution plan from the first execution plan or the second execution plan, with the selected execution plan having a lower cost based on the previously determined cardinality values; and
   executing the selected execution plan using data from a database.

12. The query processing method of claim 11, wherein the parsing of the query includes generating the one or more logical steps in the predefined canonical form, the predefined canonical form including at least one of: predefined keywords, fully qualified table names arranged in a predetermined order, or syntax templates.

13. The query processing method of claim 12, wherein the retrieving of the previously determined cardinality values for the previously executed logical steps of the first and second execution plans further includes retrieving the previously determined cardinality values for the first and second execution plans.

14. The query processing method of claim 11, wherein the parsing the query includes:
   fully qualifying each source name of each logical step in each execution plan of the first and second execution plans;
   determining that a first logical step of the one or more logical steps has multiple source names and is commutative; and
   arranging the multiple source names in the first logical step in a predetermined order.

15. The query processing method of claim 14, wherein the determining the first logical step is commutative includes determining the first logical step is for an operation including Inner Join, Full Join, Multi-Way Join, Union, or Intersect.

16. The query processing method of claim 15, further comprising:
   calculating respective hash values for each logical step of the first and second execution plans; and
   accessing the hash table in the database catalog based on the respective hash values to retrieve the respective previously determined cardinality values for the logical steps of the first and second execution plans.

17. The query processing method of claim 16, wherein the parsing of the query includes parsing a structured query language (SQL) query into operations including at least one of a Scan operator, a Join operator, an Aggregate Scan By operator, a Union operator, or an Intersect operator.

18. The query processing method of claim 11, wherein the executing the selected execution plan on data from the database includes:
   determining actual cardinality values for each of the one or more logical steps executed in the selected execution plan;
   generating new hash values based on canonical forms of the one or more logical steps executed in the selected execution plan; and
   updating the hash table in the database catalog by updating entries relating the new hash values to the actual cardinality values determined during execution of the selected execution plan.

19. The query processing method of claim 18, wherein the selecting of the execution plan from the first execution plan or the second execution plan further comprising:
   estimating a cardinality value for each logical step in each of the execution plans that does not have a previously determined cardinality value in the database catalog; and
   selecting the one of the first execution plan or the second execution plan having the lower cost based on both the previously determined cardinality values and the estimated cardinality values.

20. A non-transitory computer-readable media storing computer instructions, that when executed by one or more processors, cause the one or more processors to perform operations comprising:
   parsing a query to generate first and second execution plans for the query, each execution plan of the first and second execution plans including one or more logical steps in a predefined canonical form, the predefined canonical form including at least one of: predefined keywords, fully qualified table names arranged in a predetermined order, or syntax templates;

retrieving, using a hash table in a database catalog, previously determined cardinality values for previously executed logical steps of the first and second execution plans, the hash table storing an entry for each logical step of the previously executed logical steps, and the entry relating a hash value of the predefined canonical form of the logical step to its cardinality value;

selecting an execution plan from the first execution plan or the second execution plan, with the selected execution plan having a lower cost based on the previously determined cardinality values; and executing the selected execution plan using data from a database.

\* \* \* \* \*